July 16, 1929.   P. DODGE   1,720,723
TEMPERATURE REGULATION
Filed June 8, 1927   2 Sheets-Sheet 2
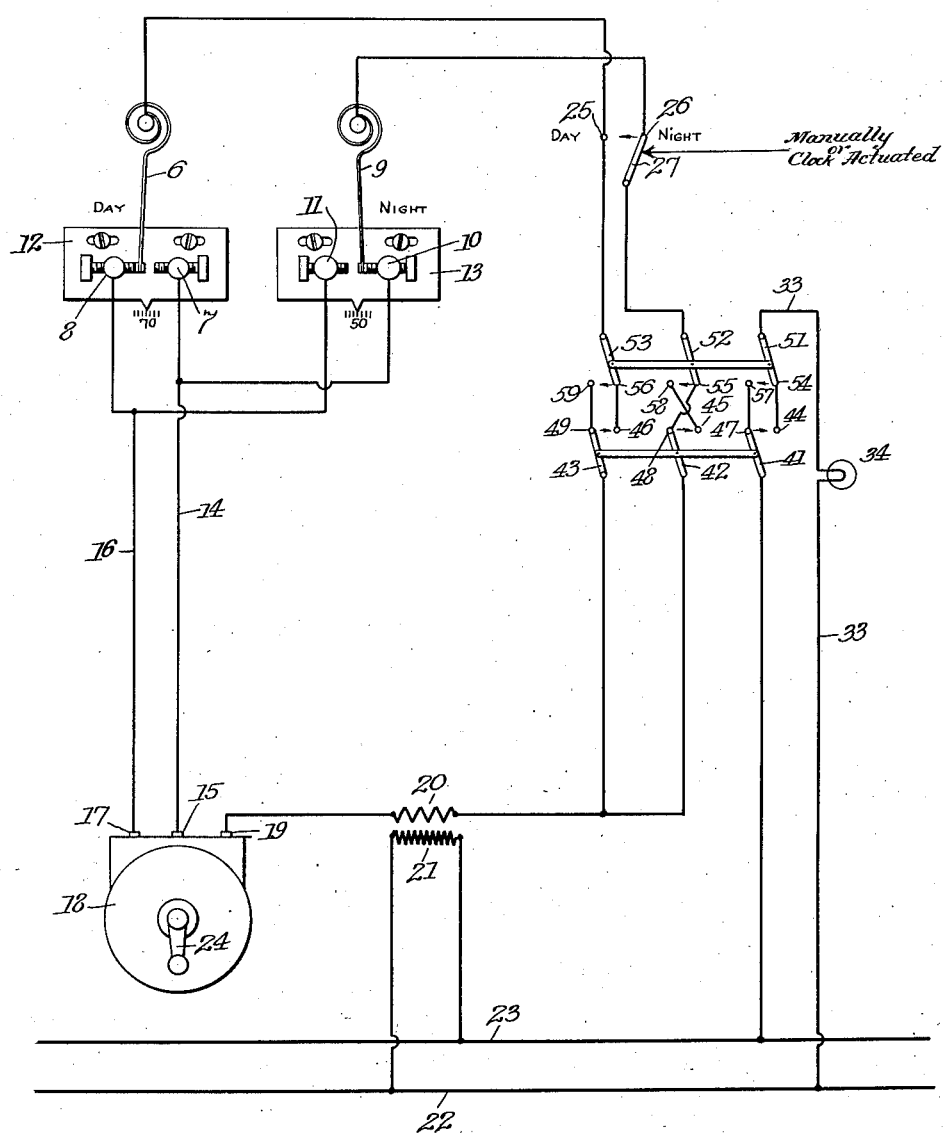

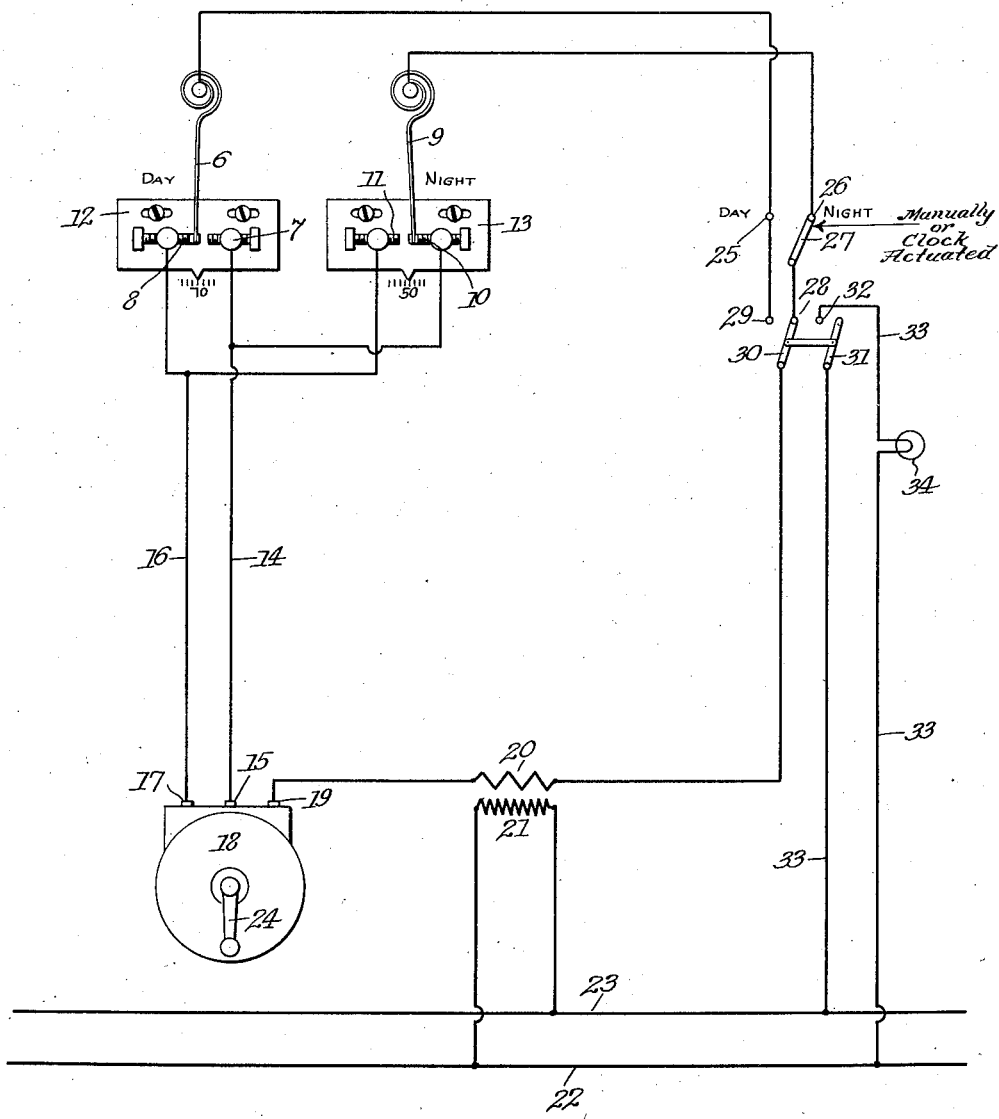

Patented July 16, 1929.

1,720,723

UNITED STATES PATENT OFFICE.

PARKER DODGE, OF SOMERSET, MARYLAND.

TEMPERATURE REGULATION.

Application filed June 8, 1927. Serial No. 197,487.

This invention relates to temperature regulation, and particularly to thermostatic control devices designed to maintain one temperature during the day and another (usually lower) temperature during the night.

In Patent No. 1,597,773 granted to me on August 31st, 1926, there is described and claimed a method of and apparatus for regulating temperature in which a so called day and night thermostat for regulating temperature is subjected to a secondary control according to the condition of a lighting circuit for a room or rooms in such house, in such manner as to inhibit the maintenance of night temperature while a certain light or lights burn.

Such prior patent described a thermostat capable of being given a bias toward either day or night setting, and a magnet winding so associated with the light circuit as to be energized when the light burns, and so associated with the thermostat as temporarily to overcome the bias toward night setting while energized. This arrangement while entirely practical requires a special thermostat structure: it is virtually necessary that the adjustment to establish the day or night bias be made at the thermostat; and it is difficult to design a compact and thermally sensitive structure in which heat generated by the resistance of the magnet winding could not materially affect the thermostat.

The present invention is an improvement in these respects, and greatly increases the utility and simplicity of the device as well as its capability of installation to meet special conditions and requirements.

Two commercial thermostats are used, a "day thermostat" set for day temperature (say 70° F.), and a "night thermostat" set for night temperature (say 50° F.). These control, in alternation with each other, a relay of any suitable form, but which may conveniently be the well known "motor switch" now extensively used to operate domestic oil burners and the like. The connection of the thermostats, alternatively with each other, in controlling relation with the relay is effected by two switches, one of which is merely an extra blade operated synchronously with the light switch blade so as to engage a "day contact" when the lights are lighted, and a "night contact" when the lights are out. The other switch is the "bias switch", and may be set in two positions, in one of which the "day contact" is connected to the "day thermostat", and the "night contact" to the "night thermostat", and in the other of which the "day contact" and "night contact" are both connected to the "day thermostat".

The thermostats may be of ordinary commercial form, although they can conveniently be embodied in a compact structure within a single case. They may be located wherever desired. The light switch is a commercial two blade double throw switch and may be placed wherever desired. The bias switch is a commercial single blade double throw switch and may be placed anywhere (for example in the owner's bed room). It may be clock controlled.

The light circuit which dominates the thermostat setting may be that for any desired room, but would ordinarily be that for the living room or entrance hall. Where the entrance hall light is the controlling circuit it is commonly desirable to control the light by the familiar "lazy-man" circuit so that the light may be controlled from a point nearby and also from a remote point (for example the upper stair hall). To secure this result it is merely necessary to substitute for the two blade double throw switch above described, two three blade double throw switches, with suitable interconnecting lazy-man circuits.

Thus all the elements of the combination are standard, may be located anywhere, and the use of the system imposes no limitations in the light switching arrangements.

Practical embodiments of the invention are illustrated in the accompanying drawing in which:—

Fig. 1 is a diagram showing the system installed with a light circuit having a single switch.

Fig. 2 is a similar diagram showing the system installed with a light circuit having two "lazy-man" switches.

Referring first to Fig. 1, the day thermostat consists of a bimetallic thermostatic switch bar 6 coacting with a "heat off" contact 7 and a "heat on" contact 8. The night thermostat consists of a thermostatic bimetallic bar 9 coacting with "heat off" contact 10 and "heat on" contact 11. The contacts 7, 8, 10 and 11 are shown as the familiar screws adjustable to determine the gap, and hence the temperature interval or lag, between reverse actuations. Also the contacts 7 and 8 are bodily adjustable to determine the temperature setting by moving the supporting insulating plate 12. Similarly the contacts 10 and 11 are adjustable by moving insulating plate 13. These or equivalent adjustments are familiar to those skilled in the art.

Contacts 7 and 10 are connected by wire 14 with binding post 15, and contacts 8 and 11 are connected by wire 16 with binding post 17. Binding posts 15 and 17 form connections to motor switch 18. The third binding post 19 in the motor switch is connected to any suitable current source, such as the secondary winding 20 of a static stepdown transformer whose primary 21 is connected across the current mains 22 and 23. From winding 20 connections, hereinafter described, lead back to the thermostatic bars selectively.

The motor switch 18, so far as its essentials are concerned, includes a motor and a motor-driven arm 24 and switches (not shown) which connect the binding posts 15 and 17 to the motor in alternation with each other. Assume that 15 is in conducting relation with the motor and the thermostat closes the circuit through 15, the motor starts and moves arm 24 through 180°, whereupon post 15 is disconnected and post 17 connected so the motor stops. When the thermostat thereafter closes the circuit to post 17, arm 24 swings another 180° disconnecting post 17 to stop the motor, and reconnecting post 15 ready for the reverse actuation, and so on. Arm 24 is connected to actuate dampers or equivalent heat control apparatus (not shown). Motor switches of this general type and various equivalent devices are well known. Generally stated any heat controller operable by a thermostatic device may be used.

Bar 6 is electrically connected to contact 25 and bar 9 to contact 26 with which the blade 27 of the "bias switch" contacts in alternation. Blade 27 is electrically connected to contact 28 and contact 25 to contact 29. Blade 30 is electrically connected with secondary winding 20 and coacts with contacts 28 and 29 in alternation. Associated with blade 30 and mechanically connected therewith for simultaneous actuation is blade 31. When blade 30 is on contact 29 blade 31 is on contact 32 and establishes a light circuit from main 22 through wires 33 and lamp 34 to main 23.

With blade 27 as shown in Fig. 1 thermostatic bar 6 will control when switch blades 30, 31 are in light on position, and thermostatic bar 9 will control when blades 30, 31 are in light off position, i. e. when 30 is on 28 and 31 off 32. With blade 27 on contact 25 bar 6 controls regardless of the position of 30, 31. The first mentioned setting of blade 27 is the night bias setting and the second setting of blade 27 is the day bias setting. Blade 27 may be clock actuated, if desired.

Referring now to Fig. 2, the parts 6 to 27 inclusive, 33 and 34 are as already described. The remainder of the wiring comprises three lazy-man circuits controlled in unison, one controlling the lights; a second operating in the same sense therewith and controlling the connection between the day contact 25 and secondary winding 20 so that when and only when the light is on, 25 and 20 are directly connected; and the third operating in the reverse sense to the other two and controlling the connection between blade 27 and secondary winding 20 so that when, and only when, the light is off, 27 and 20 are connected.

These lazy-man circuits involve two three blade double throw switches. One has three connected blades 41, 42 and 43 which in one position contact simultaneously with contacts 44, 45 and 46 and in the other position with contacts 47, 48 and 49. The other has three blades 51, 52 and 53 which in one position contact simultaneously with contacts 54, 55 and 56, and in the other position with contacts 57, 58 and 59. Blade 53 is electrically connected with contact 25, blade 52 with blade 27, blades 42 and 43 with secondary winding 20; blade 41 with main 23, and blade 51 through wires 33 and light 34 with main 22.

Contact 44 is connected to contact 54, 47 to 57, 46 to 56 and 49 to 59. To reverse the action of blades 52, relatively to 51 and 53, and of blade 42 relatively to 41 and 43, contact 45 is connected to 58 and 48 to 55.

Fig. 2 shows the bias switch blade 27 in night setting. Study of Fig. 2 will make it clear that with blade 27 so set, night thermostatic bar 9 will control when light 34 is out and day thermostatic bar 6 will control when light 34 is on. If bias switch blade 27 be shifted to contact 25 the day thermostatic bar 6 will control in all possible conditions of the light circuit.

It will be observed that the thermostats may be of standard construction, and the motor switch or relay may be, and preferably is, also of standard construction. The switches may be commercial types, for example toggle switches or push button snap acting switches.

The utmost flexibility in the location of the switches and thermostats is possible. The day thermostat and the night thermostat may be located in different rooms, if desired. The secondary control may be associated with any light circuit, and the bias switch may be located anywhere. The construction of the various parts is subject also to the widest variation.

For purposes of explanation the invention has been illustrated as applied to that type of thermostat which operates through a relay, because this is the more usual type, but the invention is not limited to application with any particular type of thermostat or to any particular type of heat controller.

What I claim is:—

1. The combination of a heat regulating device, two thermostats adjusted to respond at different temperatures electrically connected to control said heat regulating device; a light circuit; switching means controlling said light circuit; a second switching means connected to be operated synchronously with the first switching means, and normally serving to connect one or the other thermostat in controlling relation with said heat regulating device according as the light circuit is closed or open; and a bias switch operable to disconnect one thermostat from said second switching device and to connect the other thermostat in its stead, whereby said other thermostat controls irrespective of the condition of said light circuit.

2. The combination of a heat regulating device, two thermostats adjusted to respond at different temperatures electrically connected to control said heat regulating device; a light circuit; multiple lazy-man switching circuits arranged to control said light circuit to turn the light on or off and at the same time to connect said thermostats in controlling relation with said heat controlling device alternately with each other according as said light circuit is open or closed; and a bias switch operable to disconnect one thermostat from its lazy-man circuit and connect the other thermostat thereto, whereby said other thermostat is caused to control irrespective of the condition of said light circuit.

3. The combination of a relay motor, two thermostats of the double contact type electrically connected with said relay motor and each capable of controlling the same independently of the other; a light circuit; switching means controlling said light circuit; switching means connected with the first switching means to be operated synchronously therewith to connect said thermostats alternately in controlling relation with said relay motor; and a bias switch operable to disconnect one thermostat from said second switching means and connect the other in its stead, whereby said other thermostat controls said relay motor regardless of the condition of said light circuit.

4. A temperature regulating system comprising a light circuit; a heat controller; two thermostats, each capable of actuating said heat controller when operatively connected therewith; selector mechanism, including simultaneously operating units one of which is a switch which controls said light circuit and the other of which is a connecting device which operatively connects said thermostats selectively with said heat controller, as the light circuit is opened and closed by said switch; and biasing means for operatively connecting one of said thermostats with said controller regardless of the position of said selector mechanism.

In testimony whereof I have signed my name to this specification.

PARKER DODGE.